United States Patent [19]

Hanson et al.

[11] Patent Number: 4,673,187
[45] Date of Patent: Jun. 16, 1987

[54] BIMETALLIC SPIRAL WOUND GASKET

[75] Inventors: Larry K. Hanson, Los Alamitos; Gregory M. Pritchett, Long Beach, both of Calif.

[73] Assignee: Fluorocarbon Company, Los Alamitos, Calif.

[21] Appl. No.: 753,273

[22] Filed: Jul. 9, 1985

[51] Int. Cl.<sup>4</sup> ............................................. F16J 15/12
[52] U.S. Cl. .................................. 277/26; 277/1; 277/204
[58] Field of Search ............... 277/26, 203, 204, 1, 277/237, 205, 206 R

[56] References Cited

U.S. PATENT DOCUMENTS

| | | |
|---|---|---|
| 1,857,961 | 5/1932 | Lamb . |
| 2,520,089 | 8/1950 | Lippincott ........................ 277/204 |
| 3,361,430 | 1/1968 | Reid ................................. 277/26 |
| 3,604,716 | 9/1971 | Webert ............................. 277/26 |
| 4,445,694 | 5/1984 | Flaherty ........................... 277/205 |

FOREIGN PATENT DOCUMENTS 610973  6/1926  France ................................. 277/26
888138  1/1962  United Kingdom ................. 277/26

OTHER PUBLICATIONS

Brochure entitled "Sepco Metallic Gaskets" by Fluorocarbon, Sepco Metallic Gasket, Houston, Tex., p. 20, dated 9/1984.

Primary Examiner—Robert S. Ward
Attorney, Agent, or Firm—Knobbe, Martens, Olson & Bear

[57] ABSTRACT

A temperature-sensitive gasket comprised of an annular ring formed by alternating layers of a spirally wound bimetallic strip and an adjacent strip of soft filler material, such as Teflon. When viewed in cross-section, the bimetallic strip has a centrally located V-shaped fold in an otherwise flat surface. Differences in the relative rates of thermal expansivity between the convex surface and the concave surface of the bimetallic strip cause the edges of the strip to spread apart, providing a reversably tighter seal between the surfaces adjacent the gasket. The spiral wound bimetallic and filler strips are also used in combination with annular compression rings.

13 Claims, 9 Drawing Figures

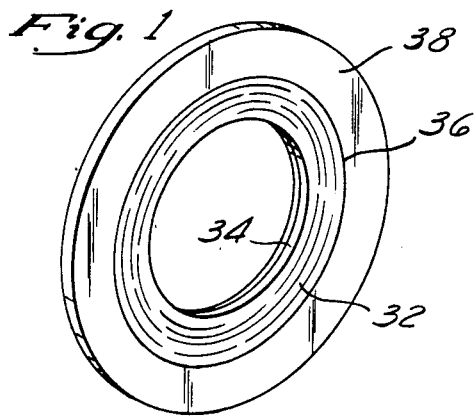
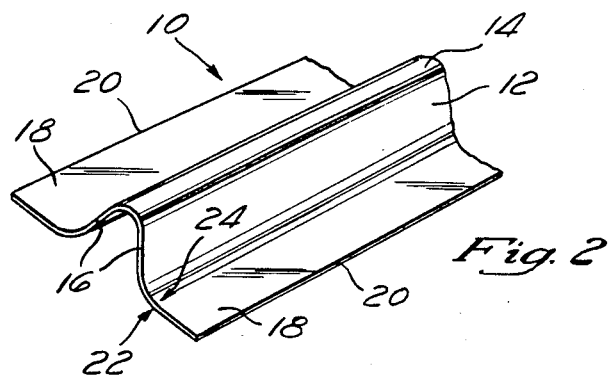
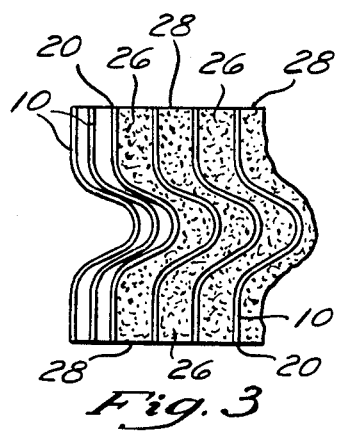
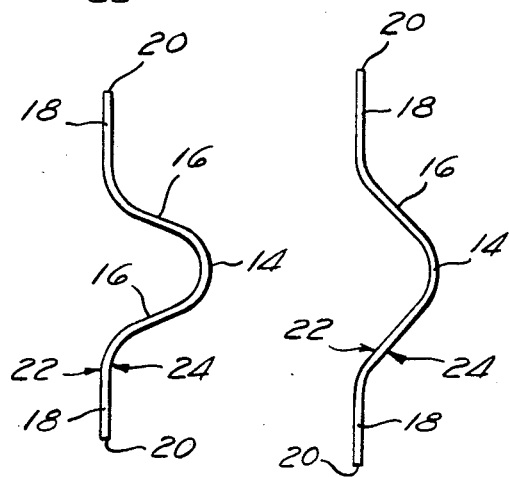
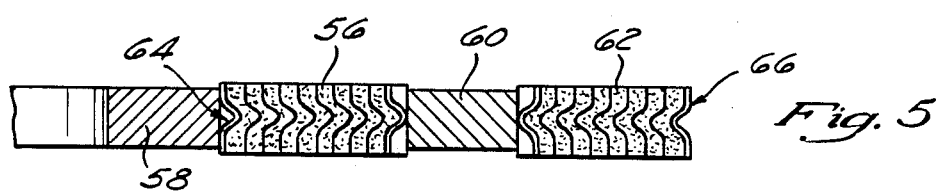
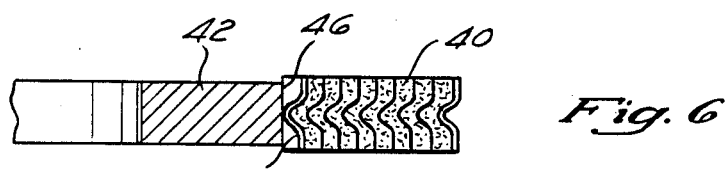
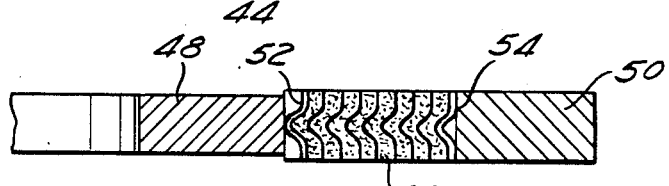
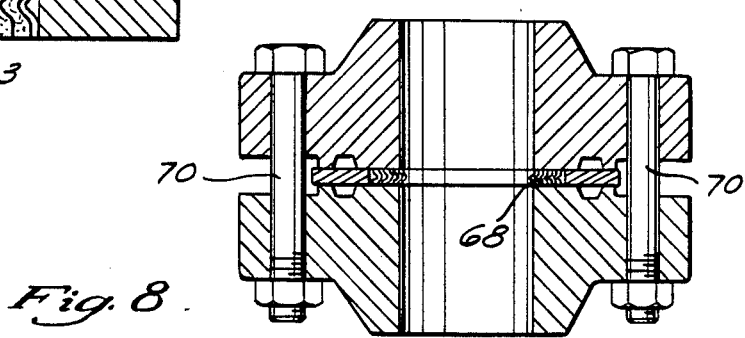

BIMETALLIC SPIRAL WOUND GASKET

BACKGROUND OF THE INVENTION

This invention relates generally to seals or gaskets, and more particularly to a spirally wound gasket.

Spirally wound gaskets known in the art generally consist of alternate layers of a thin gauge metal strip, such as stainless steel, and a thin strip of a soft, non-metallic filler material which together are wound in a spiral to form an annular ring, as is a roll of adhesive tape. The layered edges of the strips form the sealing surfaces. Suitable filler materials include various fluorocarbon polymers, asbestos, Grafoil ®, and ceramic.

The metallic strip is typically formed with a central, generally V-shaped fold or indentation throughout its length, and to either side of the fold are substantially flat portions. The filler material assumes this shape also.

The purpose of the V-shaped fold is to establish a path along which the metallic strip can deform in a resilient or elastic manner, as the gasket is compressed between the surfaces to be sealed. Effectively, the apex of the V-shape acts as a hinge about which the legs of the V pivot. Since the filler material itself is usually soft and non-resilient, the metallic strip is required to force the filler to interfere with the surfaces to be sealed.

One drawback of the previous spiral wound gaskets is that they tend to yield at high temperatures, typically, above 700° F. Due to the high degree of compression which the gaskets are subjected to, the yielding results in permanent or plastic deformation, and a loss of resiliency. This yielding occurs particularly when temperatures repeatedly cycle from high to low, and the resulting lack of resiliency causes a relatively high degree of leakage through the gasket.

Due to this leakage, spiral wound gaskets are usually not acceptable for use in "fire-safe" valves. To qualify as "fire-safe", a valve is subjected to high temperature in an open flame environment. Over a fixed period of time during the test, leakage from the valve must not exceed a certain, limited quantity. A major application for fire-safe valves is in the transport of inflammable fluids, the leakage of which during a fire can be disastrous.

The sealing characteristics of prior spiral wound gaskets are also unsatisfactory in cryogenic applications, where fluids are below −100° F. The cause of decreased sealing capability at lower temperatures is also a loss of resiliency, in this case due to the contraction and brittleness of the metal strip.

Another disadvantage of these gaskets is that the bolt torque on the joint being sealed must be very high in order to sufficiently compress the gasket to achieve a tight seal. As a result, installation of the gaskets is lengthy, and the gaskets are not suitable for use in certain applications where the bolts cannot withstand the required torque.

Thus, a need exists for a resilient, low-torque loaded gasket which is effective under severe temperature conditions.

SUMMARY OF THE INVENTION

Briefly stated, the invention is a temperature-sensitive spiral wound gasket comprised of alternate windings of a bimetallic strip and a soft, non-metallic filler. A preformed, generally V-shaped fold or indentation in the bimetallic strip runs along the strip, preferably on its central axis and for its entire length. Extending from either side of the V-shaped fold are substantially flat portions, each terminating at the side edges of the strip. The V-shape enables the resilient or elastic deformation of the bimetallic strip when its edges are compressed between the surrounding surfaces to be sealed. The filler material assumes the V-shape of the bimetallic strip when wound.

The bimetallic strip is comprised of two individual strips which are fused together, each having a different rate of thermal expansivity. Depending upon whether the depressed, concave side or protruding, convex side of the V-shaped strip has the higher rate of thermal expansivity, either an increase or decrease in temperature will cause the legs of the V to spread apart, pivoting about the apex of the V. This in turn widens the distance between the side edges of the strip, forcing the edges into a tighter sealing engagement with the surrounding surfaces.

Due to this temperature-activated expansion of the bimetallic strip, the novel gasket is more effective than previous gaskets which rely solely on compression loading to elastically force their side edges into sealing engagement with the surrounding surfaces to be sealed. In addition to this elasticity, bimetallic spiral wound gaskets also deform when there is a temperature variation, spreading the legs of the V-shape to force the side edges of the strips and the filler material into sealing engagement with the surrounding surfaces, regardless of the loading on the gasket. Thus, lower bolt torques are required for joints using the bimetallic gaskets.

The temperature induced deformation of the bimetal also eliminates leakage problems at extreme temperatures. Very hot or very cold environments will alter the elasticity and therefore sealing capability of previous spiral wound gaskets, resulting in the gasket's decreased sealing force against the surrounding surfaces. In contrast, it is exactly the extreme temperature conditions which expand the V-shaped bimetallic strip, increasing the sealing force to result in an improved seal.

In various embodiments, bimetallic spiral wound gaskets are used in combination with annular compression rings, on the inner and/or outer periphery of the winding.

BRIEF DESCRIPTION OF THE DRAWINGS

FIG. 1 is a perspective view of a bimetallic spiral wound gasket which is surrounded by an outer compression ring.

FIG. 2 is a perspective view of an unwound, V-shaped bimetallic strip.

FIG. 3 is a partial cross sectional view of the spirally wound bimetallic strip and alternating strip of filler material.

FIGS. 4a and 4b are cross sectional views of a V-shaped bimetallic strip in its normal state, and expanded state, respectively.

FIG. 5 is a partial cross sectional view of dual compression ring, dual pressure direction gasket.

FIG. 6 is a partial cross sectional view of a bimetallic spiral wound gasket with an inner compression ring.

FIG. 7 is a partial cross sectional view of a bimetallic spiral wound gasket with both an inner and an outer compression ring.

FIG. 8 is a cross section of a joint sealed with a spiral wound bimetallic gasket with an outer compression ring.

DETAILED DESCRIPTION OF THE PREFERRED EMBODIMENT

As shown in FIG. 2, prior to winding the bimetallic strip 10 into a spiral, the strip 10 is generally flat and has a substantially V-shaped indentation 12 running along its central axis. It is to be understood that the term "V-shaped" is used to refer to indentations of various shapes which generally resemble a V or U in cross section, and to strips which have such an indentation.

The V-shape has an apex 14 which is generally rounded in the embodiment illustrated, and at which point one end of the legs 16 which form the V meet. Extending from the other end of the legs are substantially flat portions 18 which terminate at the edges 20 of the strip 10. When the edges 20 of the bimetallic strip are compressed between the surfaces to be sealed, the apex 14 of the V acts as a hinge about which the legs pivot, enabling the resilient or elastic deformation of the strip. When the strip is being compressed, the angle between the legs becomes smaller, and the distance between the edges shortens.

The side of the strip on which the V-shape forms a depression or valley is the concave side 22, and the other side, on which the V-shape forms a protrusion or peak, is the convex side 24. The bimetal strip is comprised of two individual strips which have been fused together, thus each side of the strip is comprised of a different metallic substance, having a different rate of thermal expansivity.

As shown in FIGS. 4a and 4b, changes in temperature cause the strip to change shape, in order to compensate for the varying degrees of the expansion of the two sides. FIG. 4a shows the strip in its normal state at ambient temperature. FIG. 4b shows the strip in its expanded state at an extreme temperature, either high or low.

Depending on which side has the higher rate of thermal expansivity, the strip will either expand as temperatures increase, or expand as temperatures decrease. In both cases, the expansion is a result of the differing amount of expansion on either side of the V-shaped strip.

When the convex side 24 has a higher rate of thermal expansivity than the concave side 22, the strip will expand at lower temperatures. This expansion is illustrated in FIG. 4b as the spreading apart of the legs 16 of the V-shape 12, which in turn increases the distance from one edge 20 of the strip to the other. In effect, the apex 14 of the V-shape acts as a hinge about which the legs pivot to lengthen the concave side relative to the convex side.

If the metallic strip which forms the concave side 22 has a higher degree of thermal expansivity than the metallic strip which forms the convex side 24, the V-shaped strip will expand as temperatures increase, also resulting in the configuration of FIG. 4b.

If the bimetal strip were entirely flat, a change in temperature would cause the strip to bow, bringing its edges closer together. However, due to the V-shape, the same temperature change results in the spreading of the edges.

To form a spiral wound gasket, a flat bimetallic strip is indented or folded along its central axis to form a V-shaped strip with flat portions on either side of the V. This is generally accomplished by means of a roller die apparatus. The unwound, V-shaped bimetallic strip 10 is then placed next to a strip of filler material 26, and the two are wound together in a spiral with alternating layers of bimetal 10 and filler, as in FIG. 3. The filler material is generally soft and nonmetallic, able to withstand extreme temperatures, and be easily formed into various shapes. Suitable filler materials include, but are not limited to, various fluorocarbon polymers, Grafoil TM, ceramic, and asbestos.

The filler material 26 assumes the V-shape of the bimetal strip as the two strips are wound together. The edges 28 of the filler material remain exposed between the bimetal strip edges 20.

The wound gasket 32 is shaped like an annular ring, as illustrated in FIG. 1, and fluid passes through the hole in the center of the annular ring. The beginning of the winding is along the inner periphery 34 of the ring, and the end of the winding is along the outer periphery 36.

As shown in FIG. 3, the first few windings of the spiral consist of solely the bimetal strip. This is the case at both the beginning and the end of the winding. Also, the ends of the bimetal strip at both the beginning and end of the winding are fastened to the adjacent winding to prevent unraveling. Preferably this fastening is done by means of spot welding.

A spiral winding can be used as a gasket by itself, or in combination with an annular compression ring. As illustrated in FIG. 1, the spiral winding 32 can be surrounded on its outer periphery 36 by an annular compression ring 38. Preferably, the compression rings are formed from solid carbon steel. The compression rings serve several purposes. First, the ring prevents radially directed pressure from damaging the gasket by providing an inflexible barrier against which the periphery of the winding abuts, limiting the amount of deformation of the winding in the radial direction. The compression ring also serves to prevent the spiral winding from becoming crushed, or over-compressed when loaded in an axial direction, as in FIG. 8. Since the compression rings are solid and non-resilient, they serve to limit the degree of compression which can be applied to the sprial winding. Additionally, the compression rings help to ease installation and provide positive centering of the gasket on the flange being sealed.

Referring to FIGS. 5–7, the compression rings are generally slightly thinner than the spiral winding, to allow a small degree of deformation of the winding when it is compressed. For example, for a winding having a 0.175 inch thickness, the compression ring will have a thickness of 0.125 inches.

FIGS. 5–8 illustrate various configurations of spiral windings and compression rings. FIG. 6 shows a spiral winding 40 with an inner compression ring 42. The inner periphery 44 of the spiral winding surrounds the outer periphery 46 of the inner compression ring 42. A compression ring in this location strengthens the spiral winding when there is radial pressure directed inward, or toward the center of the gasket.

FIG. 7 shows a gasket having both an inner compression ring 48 and an outer compression ring 50 surrounding, respectively, both the inner 52 and outer 54 periphery of the spiral winding 53.

FIG. 5 shows a dual compression ring, dual winding gasket, wherein a first spiral bimetallic winding 56 is surrounded on both its inner and outer periphery by inner and outer compression rings 58 and 60, respectively, and the outer compression ring 60 is itself surrounded by a second spiral bimetallic winding 62. The concave side 64 of the first winding 56 faces radially inward, and the concave side 66 of the second winding faces 62 radially outward. Typically, the concave side of the strip faces in the direction of the higher pressure fluid. This is so that the high pressure will act as an expanding force on the strip, spreading apart the V, to force the edges of the winding into contact with the surfaces to be sealed. The gasket depicted in FIG. 5 is utilized where there is high pressure fluid on both the radially inner and outer sides of the gasket.

In operation, the gasket 68 is placed between the surfaces to be sealed so that the edges of the bimetal strip and non-metallic filler strip are in contact with those surfaces, as shown in FIG. 8. The concave side of the strip is facing the higher pressure fluid. The gasket is then compressed between the surfaces to be sealed, usually by means of applying torque on the bolts 70 surrounding the joint which is being sealed. This compression elastically deforms the bimetallic strip, and resiliently biases the edges of the strip into contact with the surfaces to be sealed.

If the concave side of the V-shaped strip has the higher rate of thermal expansivity, the bimetallic strip will expand as the temperature ranges from ambient to higher levels. The expansion of the strip is effected by a hinge-like motion of the legs about the apex of the V, as they pivot and spread apart, forcing the edges of the strip to move farther apart. If the concave side has the lower rate of thermal expansivity, the same expansion occurs when the temperatures decrease. In both instances, the expanding bimetallic strip forces the filler material and the edges of the bimetallic strip into closer engagement with the surrounding surfaces, resulting in a tighter seal between those surfaces. When the temperature returns to ambient, the bimetal strip resumes its original shape.

The amount of expansions or contraction of the V-shaped strip for a given temperature variation can be determined. Not only is the amount of expansion or contraction a function of the temperature change, but also of the differential in expansivity rates of the two sides of the strip, and the exact cross-sectional size and shape of the bimetallic strip.

In selecting the proper gasket for a given application, the amount and rate of expansion and contraction must be considered so that an adequate seal is provided throughout the entire range of operating temperatures. For example, if a gasket expands at higher temperatures and contracts at lower temperatures, the degree of contraction must be sufficiently small or the compression loading sufficiently high so that, despite the contraction, the gasket still provides an adequate seal at the lowest operating temperature.

Unlike conventional spiral wound gaskets, variations in temperature do not affect the resiliency of the bimetallic strip. Conventional spiral wound gaskets rely solely on the elastic deformation of the compressed winding to provide a resilient sealing force on the surrounding surfaces. Since elasticity varies with temperature, these gaskets often deform permanently under high compression loads at high temperatures, causing leakage. Similarly, cryogenic temperatures result in loss of resiliency due to contraction and brittleness.

Bimetallic spiral wound gaskets have superior sealing characteristics since, in addition to the resiliency imparted as a result of compression loading on the V-shaped strip, temperature variations also cause deformation of the bimetallic strip. As the strip expands due to an increase or decrease in temperature, the edges of the strip and the filler are forced into a tighter engagement with the surfaces to be sealed, without increasing the compression loading on the gasket. As a result, lower bolt torques are required for joints which are sealed with bimetallic gaskets.

Since the bimetallic spiral wound gasket provides a tighter seal at high temperatures, and does not yield plastically, they are suited for use in fire-safe applications.

What is claimed is:

1. A gasket comprising multiple windings of a spirally wound temperature-sensitive strip which form a ring, said strip being folded to form a V-shape along the length of the strip, the convex side of said strip having a different rate of thermal expansivity than the concave side, so that differing amounts of thermal expansion or contraction of said sides cause said V-shaped fold to open or close, resulting, respectively, in the spreading apart or the contraction of the edges of said strip, and the increased or decreased degree of sealing engagement between the edges and the components to be sealed adjacent th edges, said gasket further comprising a strip of suitable filler material wound alternately between the windings of the temperature-sensitive strip.

2. The gasket of claim 1 wherein said temperature-sensitive strip is substantially flat except for a central V-shaped fold along the length of the strip.

3. The gasket of claim 1, wherein said convex side is formed by a first metallic strip and said concave side is formed by a second metallic strip which has a lower rate of thermal expansivity than said first metallic strip, causing said V-shaped fold to open or expand at lower temperatures to provide an increased sealing force, and to contract as temperatures return to ambient levels, resuming the original degree of sealing force.

4. The gasket of claim 1, wherein said convex side is formed by a first metallic strip and said concave side is formed by a second metallic strip which has a higher rate of thermal expansivity than said first metallic strip, causing said V-shaped fold to open or expand at higher temperatures, to provide an increased sealing force, and to contract as temperatures return to ambient levels, resuming the original degree of sealing force.

5. The gasket in claim 1, wherein the ends of said temperature-sensitive strip are fastened to the adjacent windings to prevent unravelling of the strip.

6. The gasket of claim 5, wherein said ends of said temperature-sensitive strip are fastened by means of welding.

7. The gasket of claim 1, wherein at either end of the spiral, the alternate windings of filler material begin after several windings of solely the temperature-sensitive material.

8. The gasket of claim 1, wherein the radially outer perimeter of the spiral winding is circumferentially surrounded by an annular compression ring of lesser thickness than the winding, said compression ring preventing over-compression and crushing of the winding by the surrounding surfaces to be sealed.

9. The gasket of claim 1, wherein the radially inner perimeter of the sprial winding circumferentially surrounds the outer perimeter of an annular compression ring of lesser thickness than the winding, said compression ring preventing over-compression and crushing of the winding by the surrounding surfaces to be sealed.

10. A gasket wherein the radially inner perimeter of a first spiral winding of the type in claim 1 circumferentially surrounds a first annular compression ring, and the radially outer perimeter of the first winding is circumferentially surrounded by a second annular compression ring, and wherein there is a second sprial winding of the type in Claim 1, said second winding circumferentially surrounding the radially outer perimeter of said second compression ring, the concave surface of said first spiral winding facing radially inward, and the concave surface of said second winding facing radially outward, said gasket providing a seal between pressurized fluids on either side of said gasket.

11. A method of providing a temperature-sensitive seal between two parallel surfaces over a given operating temperature range comprised of:
   selecting a gasket formed from a bimetallic, spirally wound, V-shaped strip which expands as temperatures decrease at a desired rate so that despite any contraction of the V-shaped strip, at the highest temperature of the operating range an adequate seal will be provided;
   positioning said gasket between the surfaces with its edges engaging the surfaces and with the concave surface of said strip exposed to the higher pressure fluid across the gasket; and
   compressing the gasket between the surfaces to provide a sealing engagement between the gasket edges and the surfaces at ambient temperature or above, and allowing said V-shaped fold in said bimetallic strip to open in response to a decrease in temperature so that the gasket can provide a tighter seal as temperatures approach cryogenic levels.

12. A method of providing a temperature-sensitive seal between two parallel surfaces over a given temperature range comprised of:
   selecting a gasket formed from bimetallic, spirally wound, V-shaped strip which expands as temperatures increase at a desired rate so that, despite any contraction of the V-shaped strip at the lowest temperature of the operating range an adequate seal will be provided;
   positioning said gasket between the surfaces with its edges engaging the surfaces and with the concave surface of said strip exposed to the higher pressure fluid across said gasket; and
   compressing the gasket between the surfaces to provide a sealing engagement between the gasket edges and the surfaces at ambient temperature or lower, and allowing said V-shaped bimetallic strip to open in response to an increase in temperature so that the gasket can provide a tighter seal as temperatures increase, as during a fire.

13. A method of fabricating a temperature-sensitive spiral-wound gasket, comprising:
   forming a strip of bimetallic material into a substantially flat strip having a V-shaped fold along the strip's central axis, said V-shaped strip being selected of a proper bimetallic material and folded so that said strip will expand to provide a tighter seal at one extreme of the operating temperature range of the gasket, yet still provide an adequate seal at the other temperature extreme despite the contraction of the V-shaped strip;
   winding said folded bimetallic strip spirally with an adjacent strip of suitable filler material to form an annular ring having alternate windings of bimetallic and filler material; and
   fastening the ends of the bimetallic strip to the adjacent bimetallic windings to prevent unravelling of the strips.

* * * * *